(12) United States Patent
Cao et al.

(10) Patent No.: US 8,884,566 B2
(45) Date of Patent: Nov. 11, 2014

(54) METHOD OF POSITION SENSORLESS CONTROL OF AN ELECTRICAL MACHINE

(75) Inventors: Shu Yu Cao, Singapore (SG); Bing Li, Singapore (SG); Anshuman Tripathi, Singapore (SG); Lars Helle, Suldrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 135 days.

(21) Appl. No.: 13/560,444

(22) Filed: Jul. 27, 2012

(65) Prior Publication Data

US 2013/0093375 A1 Apr. 18, 2013

Related U.S. Application Data

(60) Provisional application No. 61/512,437, filed on Jul. 28, 2011.

(30) Foreign Application Priority Data

Jul. 28, 2011 (DK) .................................. 2011 70414

(51) Int. Cl.
*H02P 6/22* (2006.01)
(52) U.S. Cl.
USPC .............. 318/400.33; 318/400.2; 318/400.34; 318/727
(58) Field of Classification Search
USPC ............ 318/400.02, 400.2, 400.34, 800–811, 318/438, 700, 727, 400.33
See application file for complete search history.

(56) References Cited

U.S. PATENT DOCUMENTS

| | | | | |
|---|---|---|---|---|
| 4,388,577 A | * | 6/1983 | Blaschke et al. | 318/717 |
| 4,423,367 A | * | 12/1983 | Blaschke et al. | 318/803 |
| 4,441,065 A | * | 4/1984 | Bayer et al. | 318/808 |
| 4,477,763 A | * | 10/1984 | Asano et al. | 318/811 |
| 4,593,240 A | * | 6/1986 | Blaschke | 318/800 |
| 4,626,761 A | * | 12/1986 | Blaschke | 318/803 |
| 4,629,961 A | * | 12/1986 | Blaschke | 318/803 |
| 4,707,651 A | * | 11/1987 | Schauder | 318/800 |
| 4,780,657 A | * | 10/1988 | Brown et al. | 318/805 |
| 4,794,316 A | * | 12/1988 | Uchino et al. | 322/47 |
| 4,800,478 A | * | 1/1989 | Takahashi | 363/41 |
| 4,814,677 A | * | 3/1989 | Plunkett | 318/400.02 |

(Continued)

FOREIGN PATENT DOCUMENTS

| | | |
|---|---|---|
| EP | 1492224 A1 | 12/2004 |
| EP | 1653601 A1 | 5/2006 |
| WO | 2010023285 A1 | 3/2010 |

OTHER PUBLICATIONS

Andreescu et al. "Combined Flux Observer with Signal Injection Enhancement for Wide Speed Range Sensorless Direct Torque Control of IPMSM Drives", IEEE Transactions on Energy Conversion, Jun. 2008, vol. 23, No. 2, pp. 393-402.

(Continued)

*Primary Examiner* — Paul Ip
(74) *Attorney, Agent, or Firm* — Patterson & Sheridan, LLP (57) ABSTRACT

A position sensorless control methodology for electrical machines using high frequency flux vector signal injection in the estimated rotor flux rotational reference frame is provided. In one aspect, the estimated position error function is derived directly from the stator flux equation without any simplification. The method is applicable for electrical generator motoring mode operation from standstill and power generation mode operation.

15 Claims, 8 Drawing Sheets

(56) References Cited

U.S. PATENT DOCUMENTS

| | | | | |
|---|---|---|---|---|
| 4,968,925 | A * | 11/1990 | De Doncker | 318/727 |
| 5,023,538 | A * | 6/1991 | Mutoh et al. | 318/811 |
| 5,144,216 | A * | 9/1992 | De Doncker | 318/807 |
| 5,151,853 | A * | 9/1992 | Tatara et al. | 363/160 |
| 5,272,429 | A * | 12/1993 | Lipo et al. | 318/808 |
| 5,334,923 | A * | 8/1994 | Lorenz et al. | 318/805 |
| 5,559,419 | A * | 9/1996 | Jansen et al. | 318/808 |
| 6,014,006 | A * | 1/2000 | Stuntz et al. | 318/804 |
| 6,043,617 | A * | 3/2000 | Matsumoto et al. | 318/52 |
| 6,163,127 | A | 12/2000 | Patel et al. | |
| 6,316,905 | B1 * | 11/2001 | Depenbrock | 318/801 |
| 6,377,018 | B2 * | 4/2002 | Tajima et al. | 318/727 |
| 6,448,735 | B1 * | 9/2002 | Gokhale et al. | 318/700 |
| 6,492,788 | B1 * | 12/2002 | Agirman et al. | 318/700 |
| 6,541,937 | B2 * | 4/2003 | Kato | 318/727 |
| 6,597,148 | B1 * | 7/2003 | Niemela | 318/727 |
| 6,741,059 | B2 * | 5/2004 | Gokhale et al. | 318/700 |
| 6,768,284 | B2 * | 7/2004 | Lee et al. | 318/808 |
| 6,784,634 | B2 * | 8/2004 | Sweo | 318/727 |
| 7,102,325 | B2 * | 9/2006 | Vertanen | 318/807 |
| 7,193,383 | B2 * | 3/2007 | Sarlioglu et al. | 318/438 |
| 7,495,404 | B2 * | 2/2009 | Sarlioglu et al. | 318/438 |
| 8,076,881 | B1 * | 12/2011 | Hall et al. | 318/400.2 |
| 8,089,171 | B2 * | 1/2012 | Li et al. | 290/44 |
| 8,089,172 | B2 * | 1/2012 | Li et al. | 290/44 |
| 8,330,403 | B2 * | 12/2012 | Basic et al. | 318/400.02 |
| 8,395,360 | B2 * | 3/2013 | Tripathi et al. | 322/29 |
| 8,525,454 | B2 * | 9/2013 | Kimpara et al. | 318/400.02 |
| 2001/0043048 | A1 * | 11/2001 | Tajima et al. | 318/727 |
| 2002/0030465 | A1 * | 3/2002 | Kato | 318/727 |
| 2003/0052643 | A1 * | 3/2003 | Sweo | 318/801 |
| 2003/0071596 | A1 * | 4/2003 | Gokhale et al. | 318/727 |
| 2004/0062062 | A1 * | 4/2004 | Lee et al. | 363/37 |
| 2006/0006835 | A1 * | 1/2006 | Vertanen | 318/807 |
| 2007/0007922 | A1 * | 1/2007 | Sarlioglu et al. | 318/438 |
| 2007/0040524 | A1 * | 2/2007 | Sarlioglu et al. | 318/438 |
| 2009/0030645 | A1 | 1/2009 | Gotz et al. | |
| 2010/0109584 | A1 | 5/2010 | Kwon et al. | |
| 2010/0237817 | A1 * | 9/2010 | Liu et al. | 318/400.34 |
| 2010/0264861 | A1 * | 10/2010 | Basic et al. | 318/400.02 |
| 2010/0320763 | A1 * | 12/2010 | Li et al. | 290/44 |
| 2011/0062902 | A1 | 3/2011 | Patel et al. | |
| 2011/0109279 | A1 * | 5/2011 | Li et al. | 322/99 |
| 2012/0001573 | A1 * | 1/2012 | Kimpara et al. | 318/400.02 |
| 2012/0268081 | A1 * | 10/2012 | Tripathi et al. | 322/28 |
| 2013/0009611 | A1 * | 1/2013 | Tripathi et al. | 322/23 |
| 2013/0147442 | A1 * | 6/2013 | Tripathi et al. | 322/89 |

OTHER PUBLICATIONS

Search Report of Danish Patent Application PA 2011 70414 dated Mar. 6, 2012.

Search Report of Danish Patent Application PA 2011 70415 dated Mar. 6, 2012.

Boldea et al. "Active Flux" DTFC-SVM Sensorless Control of IPMSM, IEEE Transactions on Energy Conversion, Jun. 2009, pp. 314-322, vol. 24, No. 2.

Shi et al., "Position Control of an Interior Permanent-Magnet Synchronous Motor Without Using a Shaft Position Sensor", IEEE Transaction on Industrial Electronics, Jun. 2007, pp. 1989-2000, vol. 54, No. 4.

Cao et al., U.S. Appl. No. 13/560,494, filed Jul. 27, 2012.

* cited by examiner

METHOD OF POSITION SENSORLESS CONTROL OF AN ELECTRICAL MACHINE

FIELD OF THE INVENTION

Embodiments of the present invention relate to a position sensorless control methodology for electrical machines, in particular, determining a rotor position using a flux vector carrier signal injection.

BACKGROUND OF THE INVENTION

Electrical signal wires of shaft mounted position encoder sensors reduce the robustness of the overall generator control system due to significant mechanical vibration that exists on the turbine driven train.

Conventional Back Electromotive Force (Bemf) observation based position sensorless control methods for Interior Permanent Magnet (IPM) machines may not work well at speeds close to standstill where the generator Bemf voltage level is very low.

The performance of the conventional high frequency carrier signal injection methods, which utilizes the inductance saliency of IPM machine, is derived from the stator voltage equation. Simplification is made to ignore the effect of stator resistance variation and the effect of the fundamental frequency component so that the high frequency impedance matrix can be derived. By principle, this prior art method is sensitive to stator resistance variation and it may not be applicable for high speed operation.

According to prior art methods, the estimated position error function is based on a high frequency impedance matrix which is derived from the stator voltage equation. In these methods assumptions are made that the stator resistance variation is negligible and the fundamental frequency is very low. These assumptions make prior art methods sensitive to stator resistance variation and they are not suitable for high speed operation.

DESCRIPTION OF THE INVENTION

Embodiments of the invention generally relate to a position sensorless control methodology for electrical machines.

A first aspect of the invention provides a method for position sensorless control of an electrical machine, the method comprising
  generating a flux vector reference signal,
  modulating the flux vector reference signal by injecting a high frequency signal carrier,
  determining a position error function signal from the modulated flux vector reference signal,
  estimating the speed of the rotor,
  estimating an angular position of the rotor from the estimated speed, and
  applying the estimated rotor speed and the estimated angular rotor position to control the electrical machine.

In a second aspect, there is provided a wind turbine comprising an electrical machine, and an apparatus for position sensorless control of the electrical machine, the apparatus being adapted to carry out the methods of the first aspect.

In another aspect, there is provided a computer readable medium having a computer program recorded thereon, computer program comprising instructions which, when executed by a processor, make the processor perform a method for position sensorless control of an electrical machine in a wind turbine according to the methods of the first aspect.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One aspect of the invention provides a method for position sensorless control of an electrical machine, the method comprising
  generating a flux vector reference signal,
  modulating the flux vector reference signal by injecting a high frequency signal carrier,
  determining a position error function signal from the modulated flux vector reference signal,
  estimating the speed of the rotor,
  estimating an angular position of the rotor from the estimated speed, and
  applying the estimated rotor speed and the estimated angular rotor position to control the electrical machine.

In another embodiment, the estimated rotor speed and the estimated angular rotor position are applied in a flux vector control system of the electrical machine.

The following advantages are associated with the method according to the present invention:
  1. For the proposed solution, the estimated position error function is derived directly from stator flux equation without any simplification.
  2. The method is not sensitive to stator resistance variation.

3. The proposed solution is suitable for both low speed and high speed operation.
4. The proposed solution is robust to generator parameter variation.
5. The method is independent of PWM modulation scheme.
6. The algorithm can be easily implemented in existing control systems.

The method may be slightly modified for a stator current control system by transferring the carrier flux reference vector to a voltage vector.

In an embodiment, the method may be applied to interior permanent magnet machines or reluctance machines. In another embodiment, the method is applied to electrical generators.

In an embodiment, the flux vector reference signal may be generated from a power feedback control signal, and it may be any one of a magnetization flux reference signal and a field power flux reference signal.

In an embodiment, the method further comprises:
generating a magnetization flux reference signal and a field power flux reference signal from a power feedback control signal, and
determining a stator flux amplitude and a load angle from the magnetization flux reference signal and the field power flux reference signal, and
obtaining a stator flux position from at least the load angle.

In another embodiment, the stator flux position is used in transforming the flux vector reference signal from a natural frame to a stator stationary reference frame.

In an embodiment, the load angle is combined with the estimated angular rotor position to obtain the stator flux position.

In an embodiment, the step of determining the position error function signal may comprise the following steps:
measuring at least one current signal of the electrical machine,
band-pass filtering the at least one current signal so as to extract a response signal to the injected high frequency signal carrier, and
demodulating the extracted response signal so as to derive the position error function signal.

In an embodiment, estimating the rotor speed comprises:
applying a PI regulator to the position error function signal so as to derive an estimated speed error signal,
low-pass filtering a generator speed control signal so as to derive a speed feed forward signal, and
summing the estimated speed error signal and the speed feed forward signal so as to derive the estimated rotor speed.

In an embodiment, the step of estimating the rotor position may comprise integrating the estimated speed so as to derive the estimated rotor position.

In another embodiment, the step of estimating the rotor position comprises the initialization of the rotor position estimate.

In an embodiment, wherein the initialization comprises obtaining an initial rotor position from any of estimation by alignment of axis at standstill using flux vector control, measurement of stator voltage at an open circuit condition, and an encoder measurement prior to an encoder fault.

In an embodiment, the high frequency signal carrier has a frequency of at least 500 Hz. The fundamental frequency of 12-pole IPM generator at 500 rpm is around 50 Hz. A carrier frequency of around 500 Hz, i.e. 10-times faster than the fundamental frequency at 500 rpm, allows the electromagnetic torque response at the carrier frequency to have a negligible effect on the mechanical drive train. Alternatively, should the number of poles be reduced or increased, the carrier frequency is similarly derived.

In a second aspect, there is provided a wind turbine comprising an electrical machine, and an apparatus for position sensorless control of the electrical machine, the apparatus being adapted to carry out the methods of the first aspect.

In another aspect, there is provided a computer readable medium having a computer program recorded thereon, computer program comprising instructions which, when executed by a processor, make the processor perform a method for position sensorless control of an electrical machine in a wind turbine according to the methods of the first aspect.

In an embodiment, there is provided a position sensorless control methodology for IPM machines using high frequency flux vector signal injection in the estimated rotor flux rotational reference frame. For the proposed solution, the estimated position error function is derived directly from the stator flux equation without any simplification. Therefore, the proposed solution can be applied in a wide speed range and it may be insensitive to stator resistance variations.

In the present embodiment, the electrical machine is an interior permanent magnet generator, where permanent magnets are mounted in slots within the rotor of the generator, the rotor designed to rotate about an axis inside a stator of the generator, converting rotational movement energy to electrical energy. In other embodiments, a reluctance permanent magnet-less generator may be used, configured in a similar manner.

In the present embodiment, a wind turbine comprises an interior permanent magnet generator and the permanent magnet generator further comprises a physical position encoder for the measurement of the rotor position. It is foreseen that the sensorless control schemes can begin operation in the wind turbine generator control system if and when the position encoder suffers an operational fault and ceases to provide reliable operation.

Figure 1:
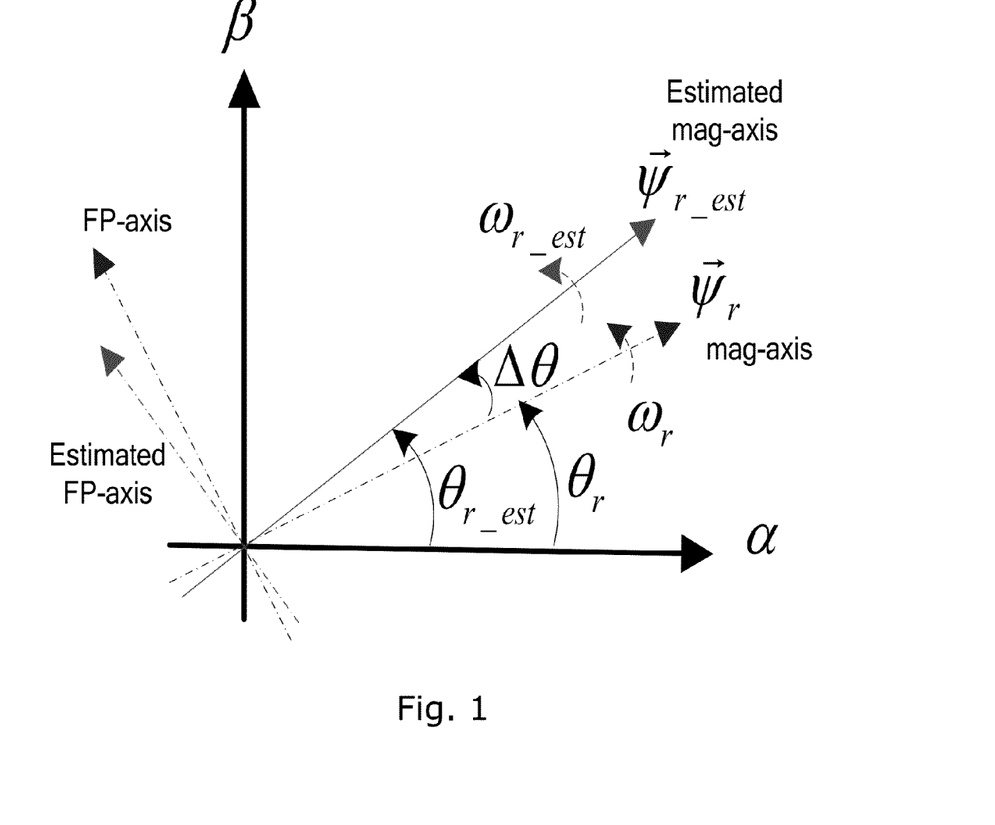
FIG. 1 shows a relationship of the reference frame for an IPM generator.

FIG. 1 illustrates the space relationship of the rotor flux reference frames used in the position sensorless control with respect to the stator stationary α/β reference frame. The direction of rotor flux vector is defined as the magnetization axis (mag-axis) along which the stator flux/current is applied to extract the reluctance power for IPM machine. The axis orthogonal to the rotor flux vector is defined as the magnet field power axis (FP-axis) along which the stator flux/current is applied to extract magnetic field power. The angle between the rotor flux vector and stator a-axis is defined as rotor flux position angle $\theta_r$. The angle between the estimated rotor flux vector and stator β-axis is defined as the estimated rotor flux position angle $\theta_{r\_est}$. The position estimation error is $\Delta\theta = \theta_{r\_est} - \theta_r$.

The working principle of the proposed solution is that, when high frequency carrier signal is injected in the flux reference signals along either the estimated FP-axis or the estimated mag-axis, the rotor position error can be driven to zero by minimizing the carrier signal response of stator current along its orthogonal axis along which no carrier signal is injected.

Figure 2A:
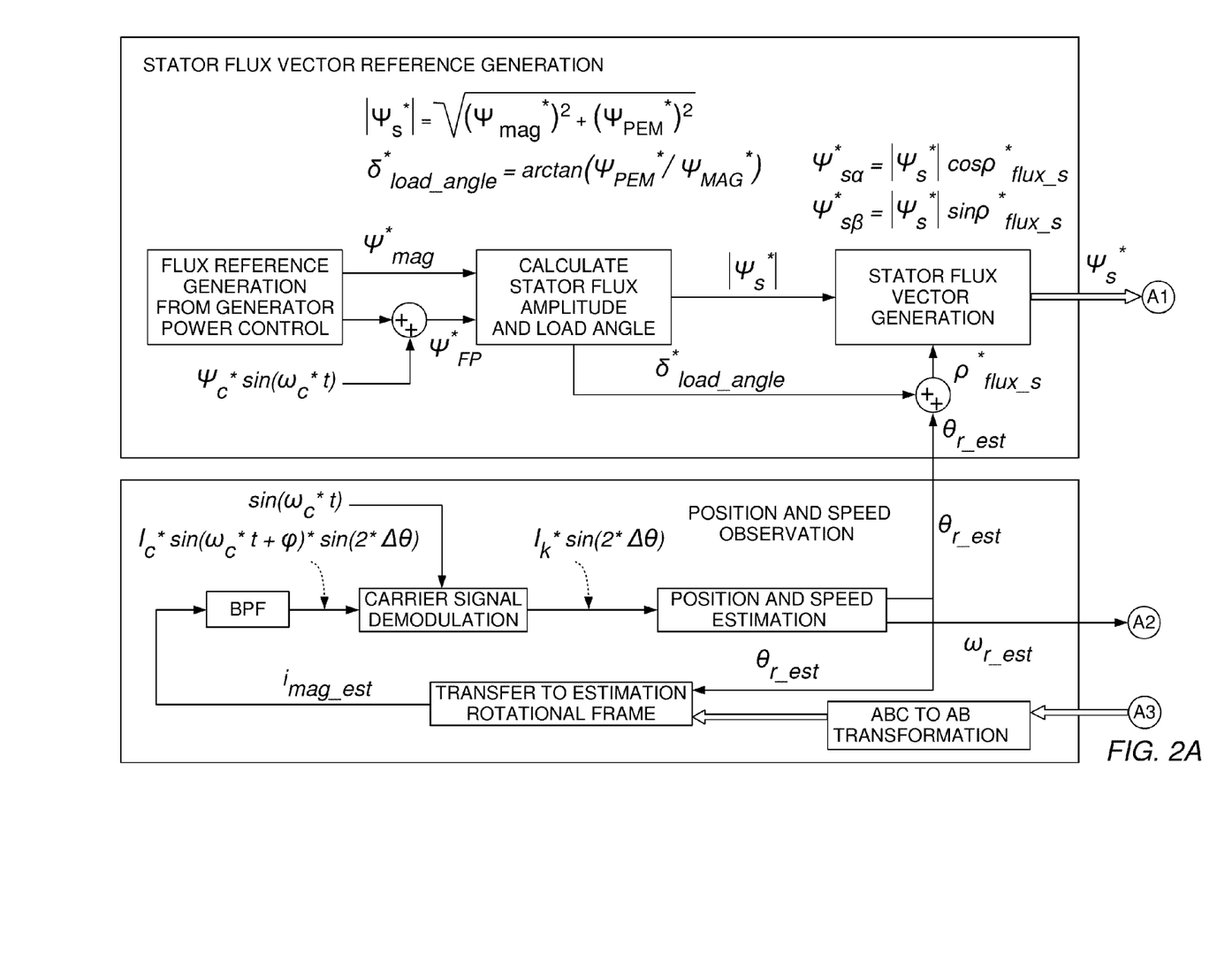
FIG. 2 shows a position sensorless stator flux control with high frequency signal injection in field power flux reference.
Figure 2B:
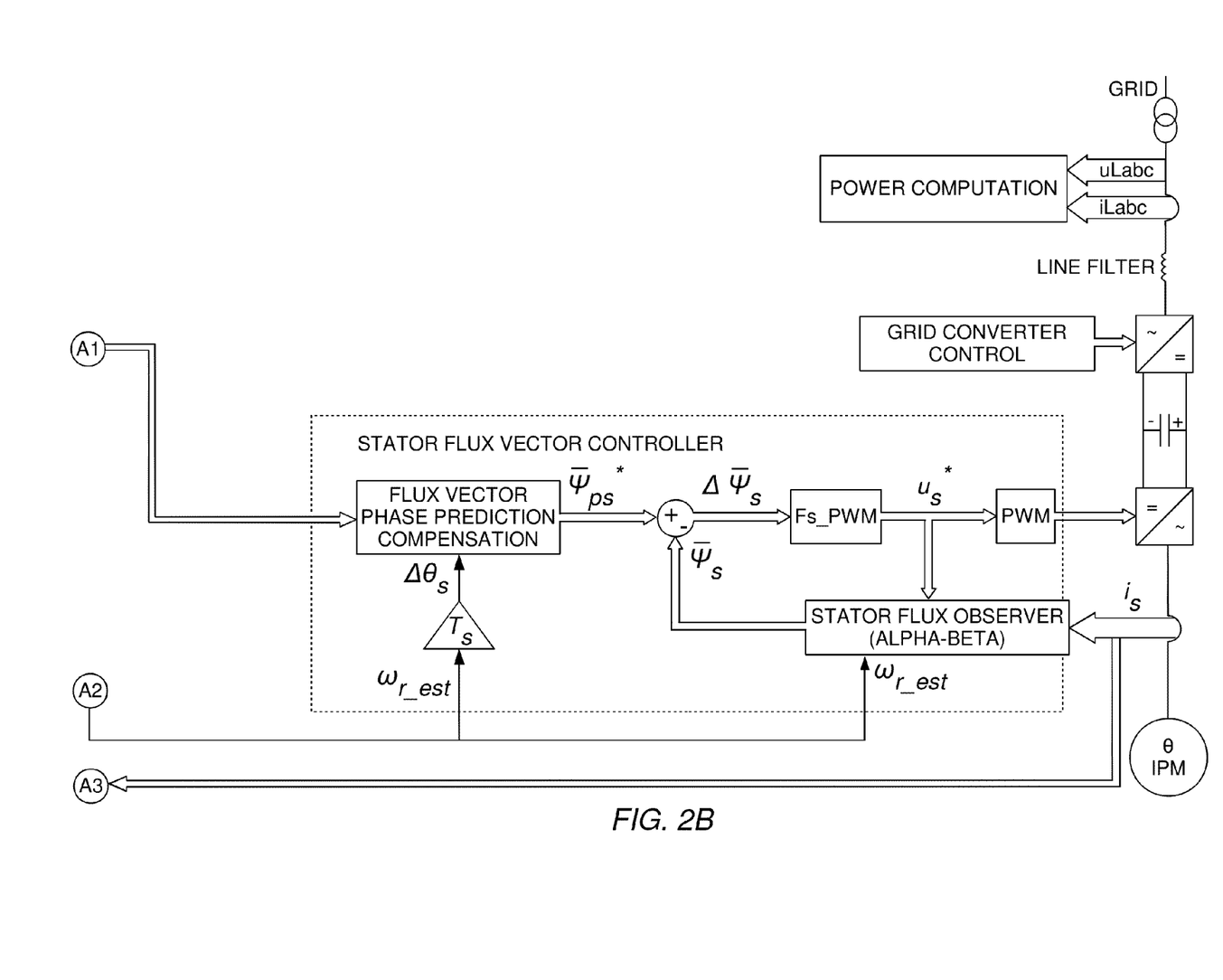
Figure 3A:
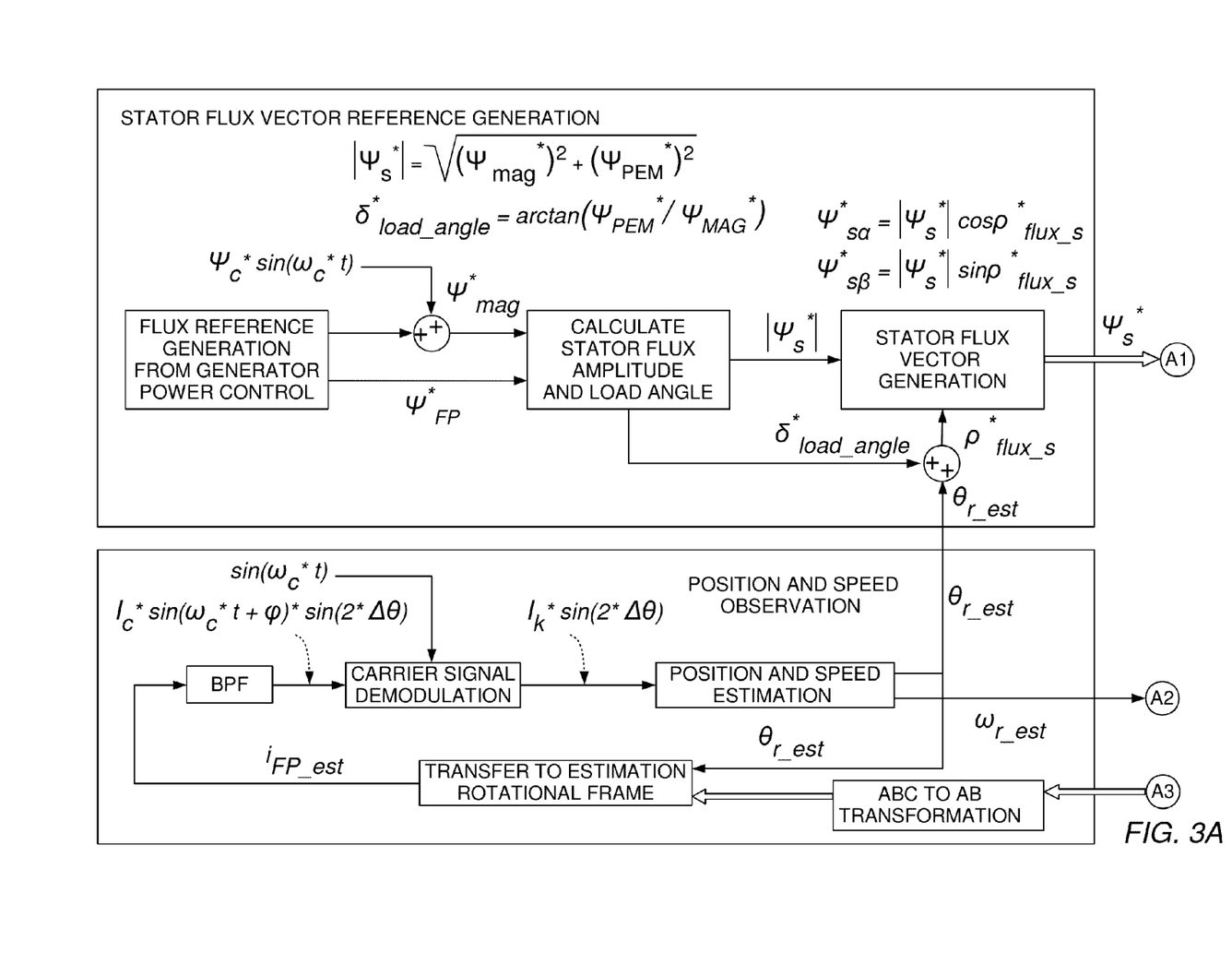
FIG. 3 shows a position sensorless stator flux control with high frequency carrier signal injection in magnetization flux reference.
Figure 3B:
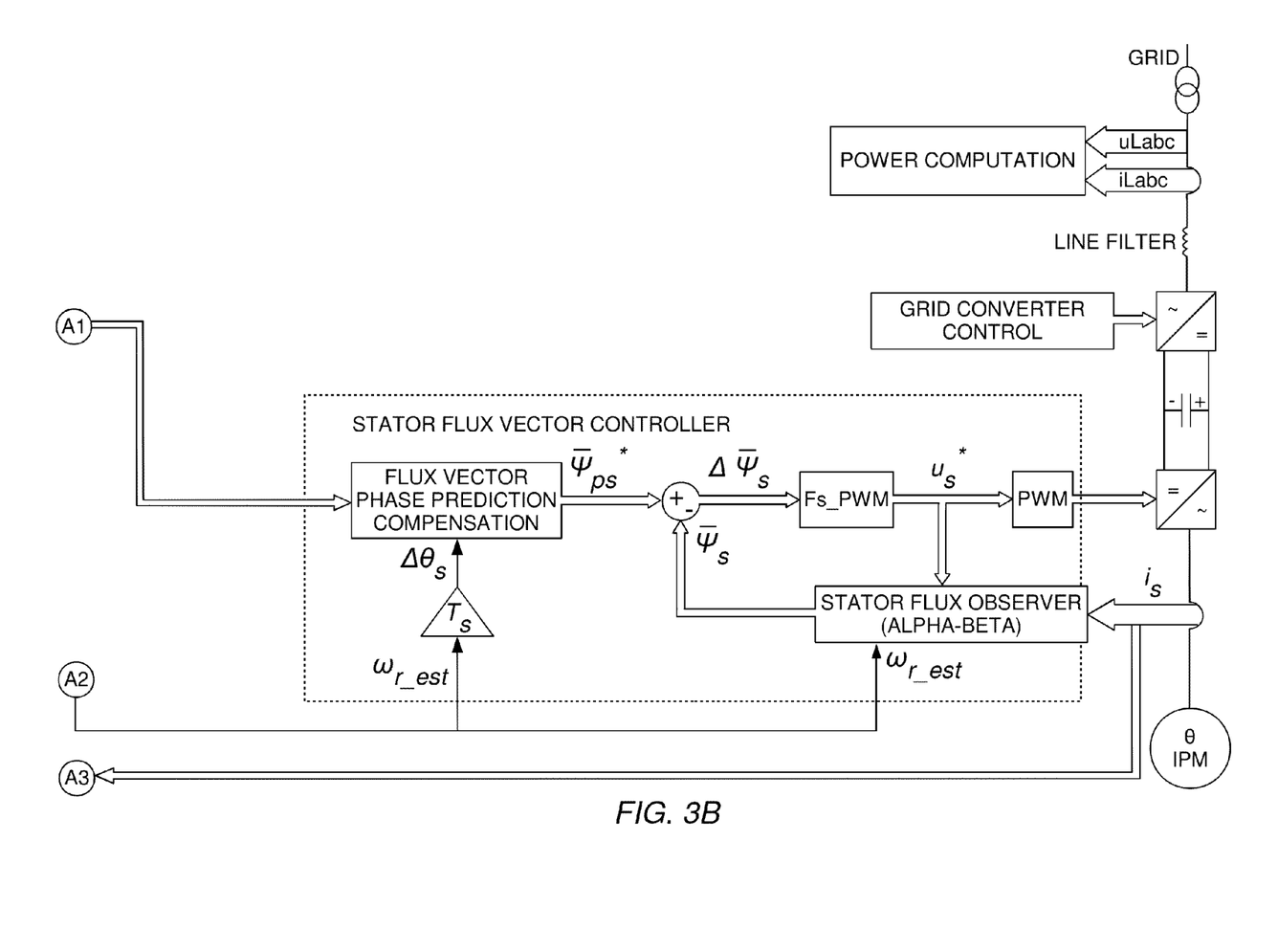

Based on the above working principle, two similar position sensorless control schemes have been developed as shown in FIG. 2 and FIG. 3. The injected flux carrier signal is chosen to be above 500 Hz with small amplitude. The selected frequency allows the electromagnetic torque response at the carrier frequency to have a negligible effect on the mechanical drive train. As shown in FIG. 2 and FIG. 3, the stator flux controller includes the stator flux reference generation unit and the stator flux vector feedback control unit. In the flux reference generation unit, the power feedback control and the optimized power trajectory tracking rule are utilized to generate the magnetization flux reference $\psi^*_{mag}$ and the field power flux reference $\psi^*_{FP}$. The high frequency carrier signal is injected in either one of these two flux references. The total stator flux amplitude $|\psi^*_s|$ and load angle $\delta^*_{load\_angle}$ are then computed from the two flux references. The estimated rotor flux position is added with the load angle to generate the stator flux position $\rho^*_{flux\_s}$. The stator flux reference vector is transformed from the natural frame to the stator stationary reference frame by utilizing the stator flux position signal. Stator flux vector closed loop control is realized with the stator flux observation at stator stationary reference frame.

In the estimated rotor flux reference frame, the flux equation is derived as equation (1).

$$\begin{bmatrix} \psi_{mag\_est} \\ \psi_{FP\_est} \end{bmatrix} = \begin{bmatrix} L_{avg} + L_{diff} * \cos(2*\Delta\theta) & -L_{diff} * \sin(2*\Delta\theta) \\ -L_{diff} * \sin(2*\Delta\theta) & L_{avg} - L_{diff} * \cos(2*\Delta\theta) \end{bmatrix} * \begin{bmatrix} i_{mag\_est} \\ i_{FP\_est} \end{bmatrix} + \psi_{mag} * \begin{bmatrix} \cos\Delta\theta \\ -\sin\Delta\theta \end{bmatrix} \quad (1)$$

Where, $$L_{avg} = \frac{L_d + L_q}{2}, L_{diff} = \frac{L_d - L_q}{2},$$

and Ld and Lq are corresponding to stator inductance in rotor flux dq reference frame.

The high frequency signal injected on the estimated FP-axis is represented as equation (2).

$$\begin{bmatrix} \psi^*_{mag\_h\_est} \\ \psi^*_{FP\_h\_est} \end{bmatrix} = \begin{bmatrix} 0 \\ \psi_c * \sin(\omega_c t) \end{bmatrix} \quad (2)$$

The carrier flux response is then is represented as equation (3) with a phase delay angle $\phi$ with respect to the carrier flux reference signal.

$$\begin{bmatrix} \psi_{mag\_h\_est} \\ \psi_{FP\_h\_est} \end{bmatrix} = \begin{bmatrix} 0 \\ \psi_c * \sin(\omega_c t + \varphi) \end{bmatrix} \quad (3)$$

From equation (1), the flux to current relationship of carrier frequency signal is represented in equation (4).

$$\begin{bmatrix} \psi_{mag\_h\_est} \\ \psi_{FP\_h\_est} \end{bmatrix} = \begin{bmatrix} L_{avg} + L_{diff} * \cos(2*\Delta\theta) & -L_{diff} * \sin(2*\Delta\theta) \\ -L_{diff} * \sin(2*\Delta\theta) & L_{avg} - L_{diff} * \cos(2*\Delta\theta) \end{bmatrix} * \begin{bmatrix} i_{mag\_h\_est} \\ i_{FP\_h\_est} \end{bmatrix} \quad (4)$$

Substitute equation (3) into equation (4), the carrier high frequency stator current response can be derived as equation (5).

$$\begin{bmatrix} i_{mag\_h\_est} \\ i_{FP\_h\_est} \end{bmatrix} = \frac{-\psi_c * \sin(\omega_c t + \varphi)}{L_{diff}^2 - L_{avg}^2} * \begin{bmatrix} L_{diff} * \sin(2*\Delta\theta) \\ L_{avg} + L_{diff} * \cos(2*\Delta\theta) \end{bmatrix} \quad (5)$$

Therefore, the high frequency current response on the mag-axis of estimated rotor flux reference frame can be represented as equation (6).

$$i_{mag\_h\_est} = \frac{-L_{diff}}{L_{diff}^2 - L_{avg}^2} * \psi_c * \sin(\omega_c t + \varphi) * \sin(2*\Delta\theta) \quad (6)$$

Utilizing equation (6), the estimated rotor position error function g ($\Delta\theta$) is derived from the measured mag-axis stator current component in below three steps:

1. Use a bandpass filter (BPF) to extract the carrier frequency response of magnetization current.

$$i_{mag\_h\_est} = BPF(i_{mag\_est}) \quad (7)$$

2. Demodulate the estimated position error signal from the carrier frequency.

$$g_1(\Delta\theta) = i_{mag\_h\_est} * \sin(\omega_c t) \quad (8)$$

$$= \frac{-L_{diff}}{L_{diff}^2 - L_{avg}^2} * \psi_c * \sin(\omega_c t + \varphi) * \sin(2*\Delta\theta) * \sin(\omega_c t)$$

$$= \frac{-L_{diff}}{L_{diff}^2 - L_{avg}^2} * \psi_c * (1/2) * \{\cos(\varphi) - \cos(2*\omega_c t + \varphi)\} * \sin(2*\Delta\theta)$$

3. Extraction of the position error signal by removing the 2-times carrier frequency component using a low pass filter (LPF).

$$g(\Delta\theta) = LPF(g_1(\Delta\theta)) \quad (9)$$

$$= LPF(i_{mag\_h\_est} * \sin(\omega_c t))$$

$$= \frac{-L_{diff}}{L_{diff}^2 - L_{avg}^2} * \psi_c * (1/2) * \cos(\varphi) * \sin(2*\Delta\theta)$$

$$= (1/2) * I_k * \sin(2*\Delta\theta)$$

$$\approx I_k * \Delta\theta$$

The estimated speed error signal is thus obtained by propositional-integral regulation (PI regulation) of the estimated position error function signal as shown in equation (10).

$$\omega_{est\_error} = K_p * g(\Delta\theta) + K_i \int g(\Delta\theta) dt \quad (10)$$

The speed feed-forward signal is generated by low pass filtering of the speed signal applied in the generator control. The low pass filter bandwidth is set to from 2 Hz to 5 Hz.

$$\omega_{FW} = LPF\_l(\omega_{est}) \quad (11)$$

The raw estimated speed signal is generated by summing up the speed error signal and the speed feed forward signal. The speed feed forward signal is important for improving the dynamic performance of position error regulation so that the position error can be minimized. (12)

$$\omega_{est\_raw} = \omega_{error} + \omega_{FW} \quad (12)$$

The estimated rotor position signal is obtained by integration of the estimated speed signal with proper initialization of the position as shown in equation (13). For IPM machine generator mode operation, the initial position is obtained from stator line voltage measurement. For IPM machine motoring mode operation, the initial position can be forced to zero or 180° by the IPM machine d-axis is aligned with the demagnetization flux vector axis using control vectors.

$$\theta_{est} = \theta_{init} + \int \omega_{est} dt \quad (13)$$

In practical implementation, the magnetization current is obtained from coordinate transformation of the measured three phase stator current.

The three phase currents are first transferred from a natural a-b-c coordinate frame into the stator stationary α-β frame using equation (14) and equation (15).

$$i_\alpha = (2*i_a - i_b - i_c)/3 \quad (14)$$

$$i_\beta = (i_b - i_c)/\sqrt{3} \quad (15)$$

The stator current magnetization current component and field power component at estimated rotor flux reference frame is thus obtained using equation (16) and equation (17).

$$i_{mag\_est} = i_\alpha \cos\theta_{est} + i_\beta \sin\theta_{eat} \quad (16)$$

$$i_{FP\_est} = -i_\alpha \sin\theta_{est} + i_\beta \cos\theta_{est} \quad (17)$$

Figure 4:
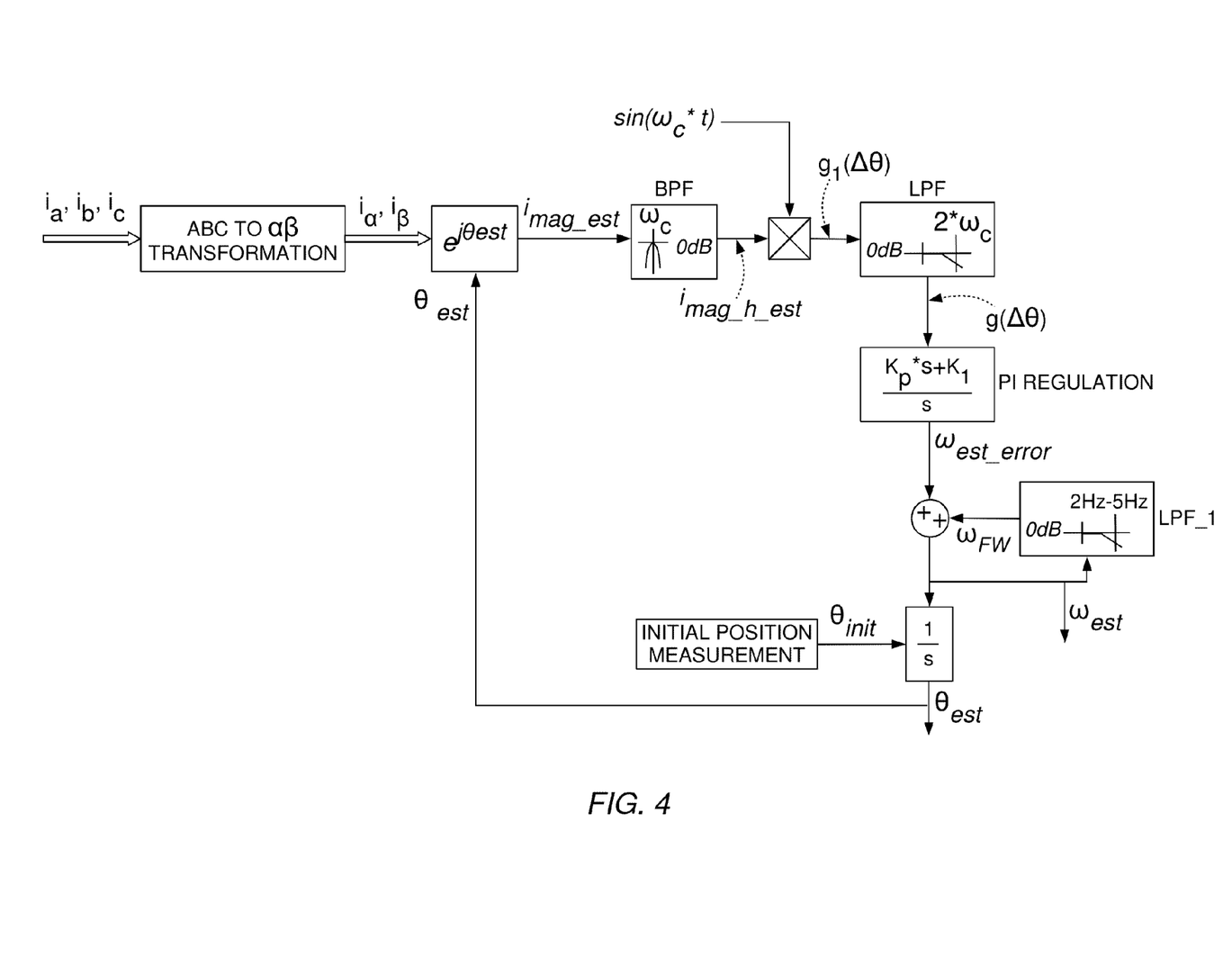
FIG. 4 illustrates position and speed observation for carrier signal injection in field power flux reference.

FIG. 4 illustrated the method for position and speed observation for the position sensorless control scheme shown in FIG. 2 with carrier signal injected in the field power flux reference signal.

For the position sensorless control scheme shown FIG. 3, a high frequency carrier signal injection is carried out in the magnetization flux reference as given in equation (18).

$$\begin{bmatrix} \psi^*_{mag\_est} \\ \psi^*_{FP\_est} \end{bmatrix} = \begin{bmatrix} \psi_c * \sin(\omega_c t) \\ 0 \end{bmatrix} \quad (18)$$

Substituting equation (18) into equation (4), the carrier signal response of stator current FP-axis component is derived as equation (19).

$$i_{FP\_h\_est} = \frac{-L_{diff}}{L^2_{diff} - L^2_{avg}} * \psi_c * \sin(\omega_c t + \varphi) * \sin(2*\Delta\theta) \quad (19)$$

The estimated position error function can be obtained using equation (20).

$$g(\Delta\theta) = LPF(i_{FP\_h\_est} * \sin(\omega_c t)) \quad (20)$$

$$= \frac{-L_{diff}}{L^2_{diff} - L^2_{avg}} * \psi_c * (1/2) * \cos(\varphi) * \sin(2*\Delta\theta)$$

$$= (1/2) * I_k * \sin(2*\Delta\theta)$$

$$\approx I_k * \Delta\theta$$

Figure 5:
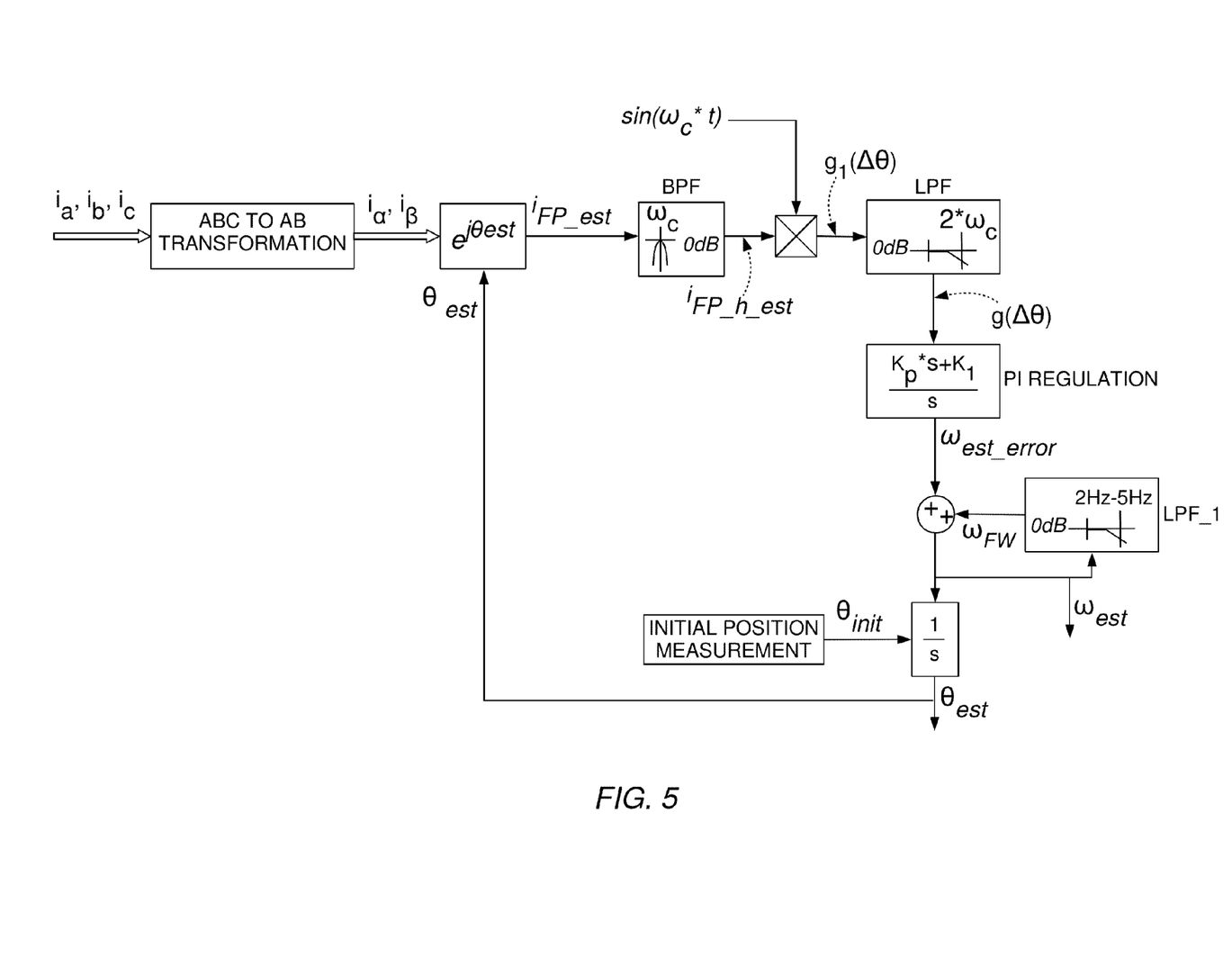
FIG. 5 illustrates position and speed estimation for carrier signal injection in the magnetization flux reference.

FIG. 5 shows the position and speed observation method for the position sensorless control scheme shown in FIG. 3 with carrier signal injected in magnetization flux reference signal.

Figure 6:
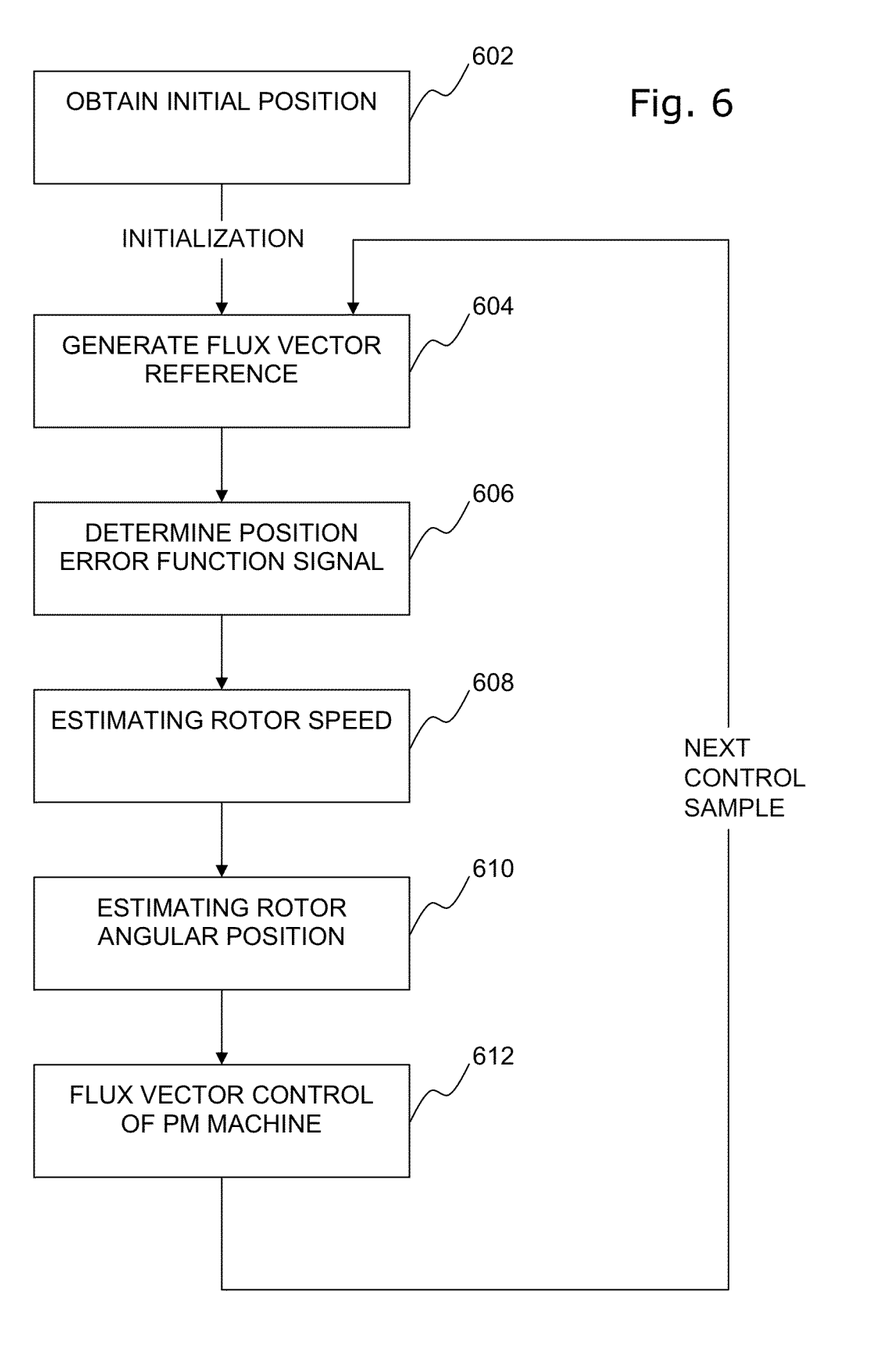
FIG. 6 shows a flow chart of the IPM position sensorless control with high frequency carrier flux vector injection.

FIG. 6 shows a flow chart for a position sensorless control system with high frequency flux vector injection method. In 602, the initial position measurement is obtained and provided as an initialization of the control system. In the present embodiment, the initial position is obtained from a stator line voltage measurement, in particular, the measurement of stator Bemf voltage at a generator open circuit condition. Alternatively, the initial position may be obtained from an encoder measurement, prior to an encoder fault. In an IPM motoring mode operation, the initial position may be obtained by an alignment of axis at standstill using flux vector control.

In 604, the flux reference is generated, and in this case, the flux reference vector is generated from power feedback control. The high frequency carrier signal is injected with either a magnetization flux reference or a field power flux reference.

In 606, the position error is extracted from corresponding current along the field power flux axis or along the magnetization flux axis without high frequency signal injection. In particular, the following steps are taken:

Current measurement in abc reference frame and transfer to alpha-beta reference frame, Current measurement transferred to estimated rotor flux reference frame, Using a bandpass filter to extract carrier signal response on current along the field power flux axis or along the magnetization flux axis, Extract position error function signal by demodulate the corresponding carrier signal response along the field power flux axis or along the magnetization flux axis.

In 608, the generator rotor speed is obtained based on proportional-integral (PI) regulation of position error signal with appropriate speed feed forward compensation. In this embodiment, the following steps are taken:

PI regulation of position error function to get the estimated speed error signal Low pass filtering the speed signal applied in generator control to get the speed feed forward signal Get the estimated speed by summing up the speed error signal and speed feed forward signal.

In 610, the estimated rotor angular position is obtained by an integration of the estimated rotor speed signal with appropriate position initialization. In 612, the estimated position and speed signal are applied in the flux vector control system. The sensorless control system thereafter returns to block 604 to determine the next control sample.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for sensorless position control of an electrical machine, the method comprising:
   generating a flux vector reference signal;
   modulating the flux vector reference signal by injecting a high frequency carrier signal;
   determining a position error function signal from the modulated flux vector reference signal;
   estimating a speed of a rotor of the electrical machine based on the position error function signal;
   estimating an angular position of the rotor from the estimated speed; and
   applying the estimated rotor speed and the estimated angular rotor position to a controller comprising a processor which, in operation, controls the electrical machine responsive to the estimated rotor speed and the estimated angular rotor position,
   wherein the flux vector reference signal is generated from a power feedback control signal.

2. The method of claim 1, wherein the estimated rotor speed and the estimated angular rotor position are applied in a flux vector control system of the electrical machine.

3. The method of claim 1, wherein the electrical machine comprises any one of an interior permanent magnet machine, a reluctance machine, and an electrical generator.

4. The method of claim 1, wherein the flux vector reference signal is any one of a magnetization flux reference signal and a field power flux reference signal.

5. The method of claim 1, further comprising:
generating a magnetization flux reference signal and a field power flux reference signal from a power feedback control signal;
determining a stator flux amplitude and a load angle from the magnetization flux reference signal and the field power flux reference signal; and
obtaining a stator flux position from at least the load angle.

6. The method of claim 5, wherein the stator flux position is used in transforming the flux vector reference signal from a natural frame to a stator stationary reference frame.

7. The method of claim 5, wherein the load angle is combined with the estimated angular rotor position to obtain the stator flux position.

8. The method of claim 1, wherein determining the position error function signal comprises:
measuring at least one current signal of the electrical machine;
band-pass filtering the at least one current signal to extract a response signal to the injected high frequency signal carrier; and
demodulating the extracted response signal to derive the position error function signal.

9. The method of claim 1, wherein estimating the rotor speed comprises:
applying a proportional integrator (PI) regulator to the position error function signal to derive an estimated speed error signal;
low-pass filtering a generator speed control signal to derive a speed feed forward signal; and
summing the estimated speed error signal and the speed feed forward signal to derive the estimated rotor speed.

10. The method of claim 9, wherein estimating the rotor position comprises the step of integrating the estimated speed so as to derive the estimated rotor position.

11. The method of claim 1, wherein estimating the rotor position comprises the initialization of the rotor position estimate.

12. The method of claim 11, wherein the initialization comprises obtaining an initial rotor position from any of an estimation by alignment of axis at standstill using flux vector control, a measurement of stator voltage at an open circuit condition, and an encoder measurement prior to an encoder fault.

13. The method of claim 1, wherein the high frequency signal carrier has a frequency of at least 500 Hz.

14. A wind turbine, comprising:
an electrical machine; and
an apparatus for sensorless position control of the electrical machine, the apparatus comprising a processor and adapted to carry out an operation, comprising:
generating a flux vector reference signal;
modulating the flux vector reference signal by injecting a high frequency carrier signal;
determining a position error function signal from the modulated flux vector reference signal;
estimating a speed of a rotor of the electrical machine based on the position error function signal;
estimating an angular position of the rotor from the estimated speed; and
controlling the electrical machine responsive to the estimated rotor speed and the estimated angular rotor position,
wherein the flux vector reference signal is generated from a power feedback control signal.

15. A computer-readable medium having a computer program recorded thereon, the computer program comprising instructions which, when executed by a processor, cause the processor to perform an operation for sensorless position control of an electrical machine in a wind turbine, the operation comprising:
generating a flux vector reference signal;
modulating the flux vector reference signal by injecting a high frequency carrier signal;
determining a position error function signal from the modulated flux vector reference signal;
estimating a speed of a rotor of the electrical machine based on the position error function signal;
estimating an angular position of the rotor from the estimated speed; and
controlling the electrical machine responsive to the estimated rotor speed and the estimated angular rotor position,
wherein the flux vector reference signal is generated from a power feedback control signal.

* * * * *